Oct. 2, 1951 DE ESTIN COLLINS ET AL 2,569,556
SUBSOIL PLOW
Filed April 11, 1949

Inventors
De Estin Collins
Myron Bergstrom

UNITED STATES PATENT OFFICE 2,569,556

SUBSOIL PLOW

De Estin Collins and Myron Bergstrom, Willard, Mont.

Application April 11, 1949, Serial No. 86,616

1 Claim. (Cl. 97—113)

This invention relates to a novel sod plow constructed to fit any type of moldboard plow when the moldboards are removed.

The primary object of this invention is to provide a sod plow which will efficiently contour slopes so that the ground will absorb sufficient moisture to facilitate the growth of such crops as hay, grass, grain and the like.

A further object of this invention is to provide a novel sod plow which will enable the farmer to plant corn, alfalfa, flax and the like in sod, and obtain good yields with a minimum of rain.

Another object of this invention is to provide a plow of the character described which will effectively loosen the ground around root bound annual crops so that more room will be provided for the absorption of moisture about the roots.

Yet another object of this invention is to provide a plow which will effectively prevent erosion and water run off.

These, together with various ancillary objects and features of the invention which will later become apparent as the following description proceeds, are attained by the device, a preferred embodiment of which has been illustrated by way of example only in the accompanying drawings, wherein.

Specific reference is now made to the drawings. In the several views in the accompanying drawings and in the following specification similar reference characters indicate corresponding elements throughout.

Indicated generally at 10 is a conventional arcuate plow beam to which is secured by means of an appropriate clamp 12 a coulter blade 14. The sod plow of the instant invention is generally indicated at 16 and is carried by both the coulter blade 14 and the plow beam 10 as will be described hereinafter.

Figure 1:
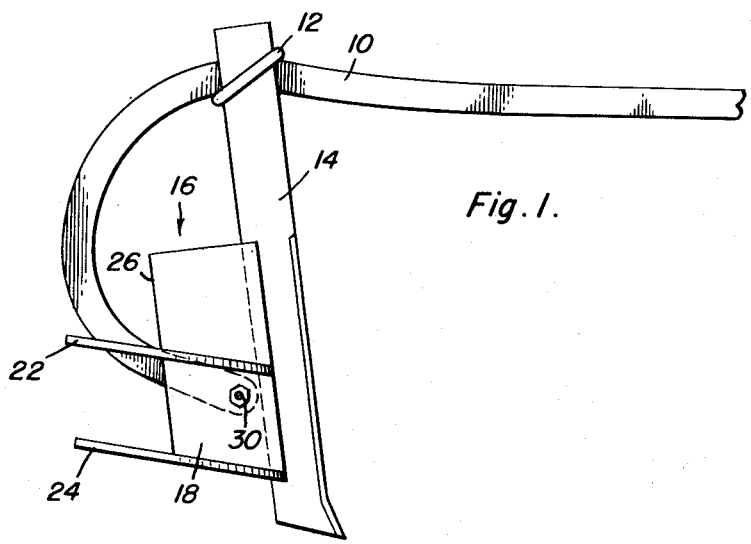
Figure 1 is a side elevational view of the device shown attached to a plow beam and coulter.
Figure 3:
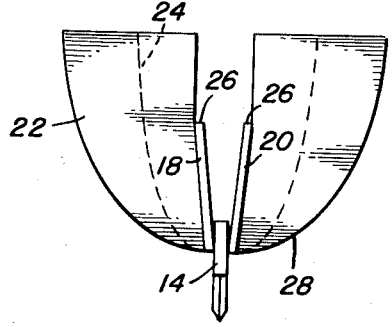
Figure 3 is a top plan view of the sod plow itself shown separated from the plow beam.
Figure 2:
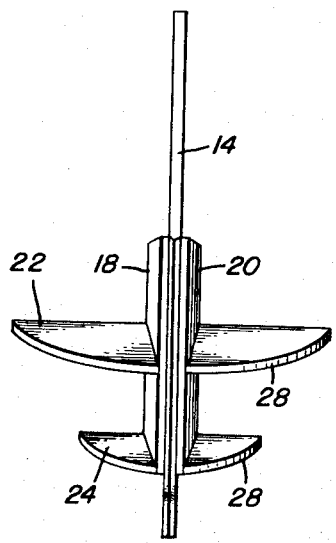
Figure 2 is an elevational view looking to the left on Figure 1.

The present sod plow consists of a pair of elongated rearwardly diverging plates 18 and 20 which are secured, as by welding or riveting adjacent the rear edge of the coulter blade. Welded or riveted to each of the plates and extending laterally thereof is a plurality of vertically spaced fins 22 and 24 which, are shown in Figures 1 and 3, extend beyond the rear edges 26 of the plates. The fins are arranged on the plates in progressively increasing width or surface area from bottom to top and consequently the upper fin 22 is necessarily wider than the next lower fin 24. Also, it will be seen that the outer peripheral edges 28 are arcuated and the fins are upwardly inclined.

The plow beam 10 extends between the plates 18 and 20 and is secured to these plates by means of appropriate bolts 30.

Thus it will be seen that a sod plow of novel construction is provided which efficiently carries out the objects of the invention as set forth hereinabove.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

In a plow construction having a plow beam and a coulter blade supported thereon; a sod plow comprising rearwardly diverging plates secured to the coulter blade, means for securing the plow beam to and between said plates, and vertically spaced, rearwardly extending, upwardly inclined fins carried by said plates, said fins including arcuate plates and extending beyond the rear edges of said peripheral edges, said fins progressively increasing in width from bottom to top of said plow construction.

DE ESTIN COLLINS.
MYRON BERGSTROM.

REFERENCES CITED

The following references are of record in the file of this patent:

UNITED STATES PATENTS

| Number | Name | Date |
|---|---|---|
| 31,108 | Cameron | Jan. 15, 1861 |
| 184,171 | Porter | Nov. 7, 1876 |
| 366,420 | McWhinney | July 12, 1887 |
| 629,712 | Coons | July 25, 1899 |
| 848,565 | McMullin | Mar. 26, 1907 |
| 1,333,159 | Carter | Mar. 9, 1920 |

FOREIGN PATENTS

| Number | Country | Date |
|---|---|---|
| 612,321 | France | July 27, 1926 |